(12) United States Patent
He

(10) Patent No.: US 9,777,624 B2
(45) Date of Patent: Oct. 3, 2017

(54) IMPROVED-EFFICIENCY ROTARY ENGINE WITH MOVEABLE BAFFLE

(71) Applicant: Shili He, Wenzhou (CN)

(72) Inventor: Shili He, Wenzhou (CN)

( * ) Notice: Subject to any disclaimer, the term of this patent is extended or adjusted under 35 U.S.C. 154(b) by 0 days.

(21) Appl. No.: 15/036,764

(22) PCT Filed: Aug. 29, 2014

(86) PCT No.: PCT/CN2014/085490
§ 371 (c)(1),
(2) Date: May 13, 2016

(87) PCT Pub. No.: WO2015/070659
PCT Pub. Date: May 21, 2015

(65) Prior Publication Data
US 2016/0290222 A1    Oct. 6, 2016

(30) Foreign Application Priority Data
Nov. 13, 2013    (CN) .......................... 2013 1 0569757

(51) Int. Cl.
*F01C 13/00*    (2006.01)
*F03C 2/00*    (2006.01)
(Continued)

(52) U.S. Cl.
CPC .............. *F02B 53/12* (2013.01); *F01C 9/002* (2013.01); *F01C 21/008* (2013.01); *F01C 21/02* (2013.01); *F01C 21/08* (2013.01); *F01C 21/106* (2013.01); *F01C 21/18* (2013.01); *F02B 55/02* (2013.01); *F02B 55/08* (2013.01); *F02N 11/08* (2013.01);
(Continued)

(58) Field of Classification Search
CPC ........ F04C 23/008; F04C 29/04; F02B 53/00; F02B 53/12; F02B 55/02; F02B 55/08; F01C 9/002; F01C 21/008; F01C 21/02; F01C 21/08; F01C 21/106; F01C 21/18
USPC ............... 418/181, 35; 123/241, 18 R, 18 A, 123/18 AA
See application file for complete search history.

(56) References Cited

U.S. PATENT DOCUMENTS 5,484,272 A    1/1996 Horn

FOREIGN PATENT DOCUMENTS

CN    1055578 A    10/1991
CN    201092883 Y    7/2008
(Continued)

*Primary Examiner* — Theresa Trieu
(74) *Attorney, Agent, or Firm* — Christensen, Fonder, Dardi & Herbert PLLC

(57) ABSTRACT

A rotary engine that includes at least two sets of baffles that are arranged between a cylinder body and a rotor, and are in seal fit with the inner wall of the cylinder body to form at least two sealed cavities in the cylinder body; at least one set of the baffle is a movable baffle, and can rotate around the center of the cylinder body; a one-way rotation mechanism is arranged between the movable baffle and the rotor, and drives the rotor to rotate in one direction. The rotary engine has the benefits that the sealed cavities are formed by the movable baffle and the cylinder body; four working strokes including air suction, compression, ignition and exhaust are carried out in each sealed cavity; the movable baffle rotates under acting and counter-acting forces, drives the one-way rotation mechanism to rotate, and then drives the rotor to rotate.

20 Claims, 11 Drawing Sheets

(51) Int. Cl.
*F03C 4/00* (2006.01)
*F04C 2/00* (2006.01)
*F02B 53/12* (2006.01)
*F02B 55/02* (2006.01)
*F02B 55/08* (2006.01)
*F01C 9/00* (2006.01)
*F01C 21/00* (2006.01)
*F01C 21/02* (2006.01)
*F01C 21/08* (2006.01)
*F01C 21/10* (2006.01)
*F01C 21/18* (2006.01)
*F02N 11/08* (2006.01)
*F04C 23/00* (2006.01)
*F04C 29/04* (2006.01)

(52) U.S. Cl.
CPC ............ *F04C 23/008* (2013.01); *F04C 29/04* (2013.01); *Y02T 10/17* (2013.01)

(56) References Cited

FOREIGN PATENT DOCUMENTS

| | | | |
|---|---|---|---|
| CN | 101397934 A | 4/2009 | |
| CN | 103032158 A | 4/2013 | |
| CN | 103615311 A | 3/2014 | |
| CN | 203515795 U | 4/2014 | |
| DE | 2 320 353 | 11/1974 | |
| DE | 31 23 121 A1 | 12/1982 | |
| FR | 2 116 650 | 7/1972 | |
| FR | 2116650 A5 * | 7/1972 | ............. F01C 1/063 |
| JP | 47-25506 | 10/1972 | |
| JP | 48-18615 | 3/1973 | |
| JP | 48-018615 A * | 3/1973 | ............. F02B 53/00 |
| JP | 55-35114 A | 3/1980 | |
| JP | 2001-289053 A | 10/2001 | |
| JP | 2011-521168 A | 7/2011 | |

\* cited by examiner

IMPROVED-EFFICIENCY ROTARY ENGINE WITH MOVEABLE BAFFLE

RELATED APPLICATIONS

The present application is a National Phase entry of PCT Application No. PCT/CN2014/085490, filed Aug. 29, 2014, which claims priority to Chinese Patent Application No. 201310569757.8, filed Nov. 13, 2013, the disclosures of which are hereby incorporated by reference herein in their entirety.

TECHNICAL FIELD

The invention relates to an engine, in particular to a rotary engine.

BACKGROUND ART

In the current market, four-stroke piston reciprocating engines are the ones which are most widely used, but rotary engines are the ones which are well-known but rarely applied.

Just as the conventional reciprocating engines, the rotary engines obtain the rotating force from expansion pressure generated during the combustion of air-fuel mixed gas. The difference between the two types of engines is the use manner of the expansion pressure. In a reciprocating engine, the expansion pressure generated on the top surface of a piston pushes the piston downwards, then mechanical force is transferred to a connecting rod, and a crankshaft is driven to rotate, while in a rotary engine, the expansion pressure is exerted on a side surface of a rotor, and then the rotor is driven to rotate.

Compared with the conventional reciprocating engine, the rotary engine has the advantages that the engine speed is increased, the mass is low, the size is small, the power per liter is high, the operation is smooth, and the vibration and the noise are low.

Triangular rotary engines, taking a great proportion of the conventional rotary engines, are complex in structure, high in production requirements, difficult in cylinder compression ratio adjustment, high in fuel oil consumption, and insufficient in power.

SUMMARY

In order to overcome the defects in the background art, the invention provides a rotary engine to solve the problem that the conventional rotary engines are complex in structure, high in fuel oil consumption and low in power.

The invention adopts a technical scheme: a rotary engine comprises a cylinder body, a rotor, as well as an air inlet, an air outlet and an ignition device, which are arranged on the cylinder body, wherein at least one set of movable baffle is arranged in the cylinder body, and is in seal fit with the inner wall of the cylinder body to form at least two sealed cavities in the cylinder body; the movable baffle can rotate around the center of the cylinder body; a one-way rotation mechanism is arranged between the movable baffle and the rotor, and drives the rotor to rotate in one direction.

The rotary engine further comprises a fixed baffle, and one set of the movable baffle is arranged and can rotate around the center of the cylinder body in a reciprocating manner.

The one set of movable baffle comprises two inner catches and a disk for fixing the inner catches, and a rotating shaft is further arranged in the center of the disk.

The one-way rotation mechanism comprises a first one-way bearing and a second one-way bearing which are arranged on the rotating shaft but different in direction, the first one-way bearing and the second one-way bearing are connected with the rotor via two sets of different transmission mechanisms respectively, one set of transmission mechanism drives the rotor and the first one-way bearing to rotate in the same direction, while the other set of transmission mechanism drives the rotor and the second one-way bearing to rotate in opposite directions.

The transmission mechanism driving the rotor and the first one-way bearing to rotate in the same direction is a belt transmission mechanism, and the transmission mechanism driving the rotor and the second one-way bearing to rotate in the opposite directions is a gear meshing transmission mechanism.

The fixed baffle and the cylinder body form an integral structure, and the air inlet, the air outlet and the ignition device are arranged in the fixed baffle.

Two sets of movable baffles are arranged in the cylinder body, and both rotate in one and the same direction around the center of the cylinder body.

The one set of movable baffle comprises two inner catches and a disk for fixing the inner catches, the rotor is arranged in the center of the cylinder body, and the disk is arranged on the rotor in a sleeving manner.

The disks are arranged on the same side of the cylinder body.

The one set of movable baffle comprises one inner catch and a disk for fixing the inner catch, the rotor is arranged in the center of the cylinder body, and the disk is arranged on the rotor in a sleeving manner.

The number of the cylinder bodies is two, the two cylinder bodies are superposed, and the movable baffles in one-cylinder body are fixedly connected with the movable baffles in the other cylinder body.

The one-way rotation mechanism comprises first movable teeth and second movable teeth; first chutes used for mounting of the first movable teeth are radially formed in the cylinder bodies; the first movable teeth are in sliding fit with the first chutes; an elastic resetting element is connected with one end of each first movable tooth, while the other end of the first movable tooth is a slope; second chutes used for mounting of the second movable teeth are radially formed in the rotors; the second movable teeth are in sliding fit with the second chutes; and an elastic resetting element is connected with one end of each second movable tooth, while the other end of the second movable tooth is a slope of which the direction is opposite to that of the slopes of the first movable teeth.

The first movable teeth and the second movable teeth are arranged outside the cylinder bodies; and outer catches are arranged between the first movable teeth and the second movable teeth, and are connected with the disks.

A plurality of sets of air inlets, air outlets and ignition devices are distributed on outer rings of the cylinder bodies uniformly in a concentrated manner.

The rotary engine further comprises an intermittent transmission mechanism used for intermittent transmission between the two sets of movable baffles.

The rotary engine further comprises a starting device, wherein the starting device comprises a starting motor and a starting coil, and a connecting groove in linked connection with the starting motor and a lug propped against the starting coil are formed in each movable baffle.

A trigger induction device is also arranged on each movable baffle.

A plurality of sets of cylinder bodies and movable baffles in the cylinder bodies can be superposed.

A compressor comprises a compression component and a rotary engine, wherein the compression component comprises a compression cylinder and a compression partition board; the rotary engine comprises a cylinder body, a rotor, as well as an air inlet, an air outlet and an ignition device, which are arranged on the cylinder body; at least one set of movable baffle is arranged in each cylinder body, and is in seal fit with the inner wall of the cylinder body to form at least two sealed cavities; the movable baffle can rotate around the center of the cylinder body; the movable baffle is connected with the compression partition board, and can drive the compression partition board to rotate.

The rotary engine has the benefits: due to the adoption of the scheme, the sealed cavities are formed by the movable baffle and the cylinder body; four working strokes including air suction, compression, ignition and exhaust are carried out in each sealed cavity; the movable baffle rotates under acting force and counter-acting force, drives the one-way rotation mechanism to rotate at the same time, and further drives the rotor to rotate, thus the engine works. By utilizing the simple structure of the movable baffle, the rotary engine not only can adjust the compression ratio in the cylinder better to save fuel oil, but also has more sufficient power because the acting force and the counter-acting force exerted on the movable baffle are large.

In the figures: 1-Cylinder body, 2-Rotor, 3-Air inlet, 4-Air outlet, 5-Ignition device, 6-Movable baffle, 61-Inner catch, 62-Disk, 63-Rotating shaft, 64-Outer catch, 65-Connecting groove, 66-Lug, 7-Movable baffle, 8-First movable tooth, 9-Second movable tooth, 11-First one-way bearing, 12-Second one-way bearing, 13-Gear meshing transmission mechanism, 14-Belt transmission mechanism, 15-Spring, 16-First chute, 17-Second chute, 18-Compression component, 19-First incomplete gear, 20-Second incomplete gear, 21-Gearwheel, 22-Pinion, 23-Joint shaft.

DETAILED DESCRIPTION

The embodiments of the invention will be further described below with reference to the drawings:

Embodiment I

Figure 1:
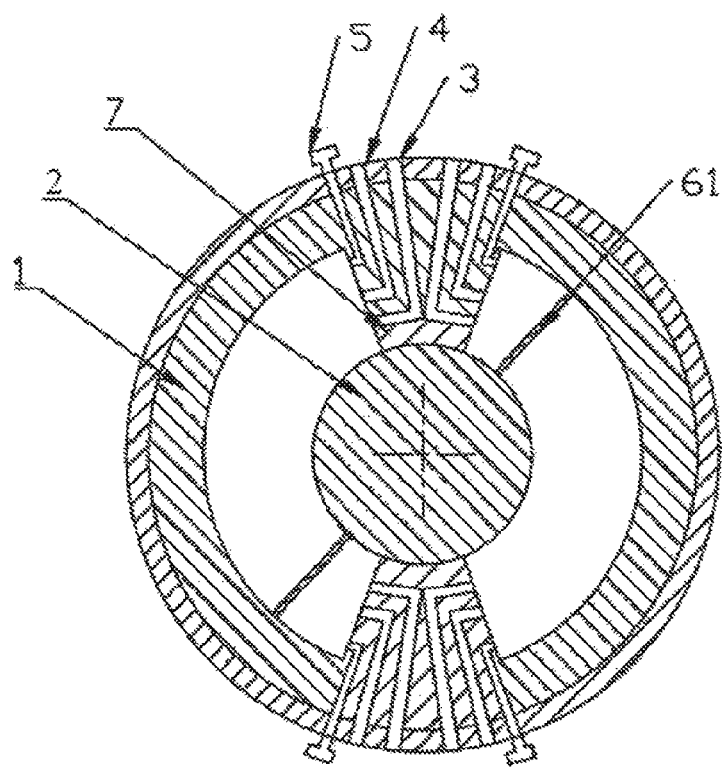
FIG. 1 is a structural diagram of an embodiment I of the invention.
Figure 2:
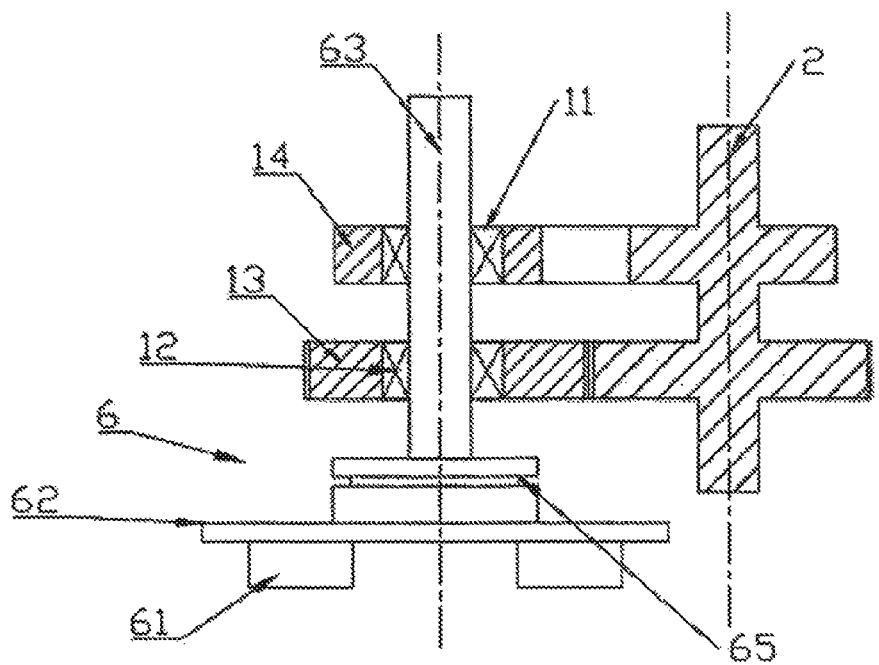
FIG. 2 is a diagram I of a transmission device of the embodiment I of the invention.
Figure 3:
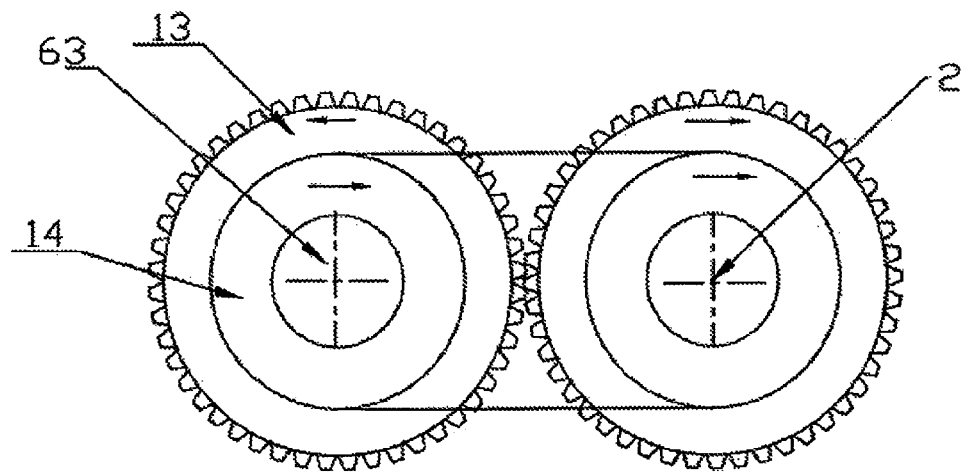
FIG. 3 is a diagram II of the transmission device of the embodiment I of the invention.

As shown in FIGS. 1, 2 and 3, a rotary engine comprises a cylinder body 1, a rotor 2, as well as an air inlet 3, an air outlet 4 and an ignition device 5, which are arranged on the cylinder body 1, wherein one set of movable baffle 6 is arranged between the cylinder body and the rotor 2, and can rotate around the center of the cylinder body 1 in a reciprocating manner.

The ignition device 5 can be either a fuel spray nozzle or a sparking plug.

The rotary engine further comprises two fixed baffles 7; the one set of movable baffle 6 comprises two inner catches 61 and a disk 62 for fixing the inner catches 61; four sealed cavities are formed by the disk 62, the two fixed baffles 7, the two inner catches 61 and the inner wall of the cylinder body 1, and correspond to four working strokes including air suction, compression, ignition and exhaust respectively.

Moreover, the number of the fixed baffle(s) 7 also can be one, thus the one set of movable baffle comprises one inner catch 61 and a disk 62 for fixing the inner catch 61, and two sealed cavities are formed by the disk 62, the fixed baffle 7, the inner catch 61 and the inner wall of the cylinder body 1.

In the rotary engine, the fixed baffle 7 and the cylinder body 1 form an integral structure, and the air inlet 3, the air outlet 4 and the ignition device 5 are arranged in the fixed baffle 7, so that the structure is simpler, and the action effect is better.

A rotating shaft 63 is further arranged in the center of the disk 62 of the movable baffle 6; a one-way rotation mechanism is arranged on the rotating shaft 63, and comprises a first one-way bearing 11 and a second one-way bearing 12 opposite in direction; a gear meshing mechanism 13 is arranged between the second one-way bearing 12 and the rotor 2, and drives the rotor 2 and the second one-way bearing 12 to rotate in opposite directions; a belt transmission mechanism 14 is arranged between the first one-way bearing 11 and the rotor 2, and drives the rotor 2 and the first one-way bearing 11 to rotate in the same direction. Therefore, when the movable baffle 6 rotates in a reciprocating manner constantly, the rotor 2 can be driven to rotate in the same direction ceaselessly.

Moreover, a connecting groove 65 connected with a starting device is formed in the disk 62 of the movable baffle 6, so that the starting device can drive the movable baffle 6 to rotate once starting is carried out; a trigger induction device is further arranged; when the movable baffle 6 rotates to a certain position, automatic ignition is carried out, so that the rotary engine gets into a work state smoothly, and the normal starting work of the rotary engine can be further ensured.

Besides, a plurality of sets of cylinder bodies 1 and the movable baffles 6 in the cylinder bodies 1 can be superposed, so that the power is higher.

Figure 4:
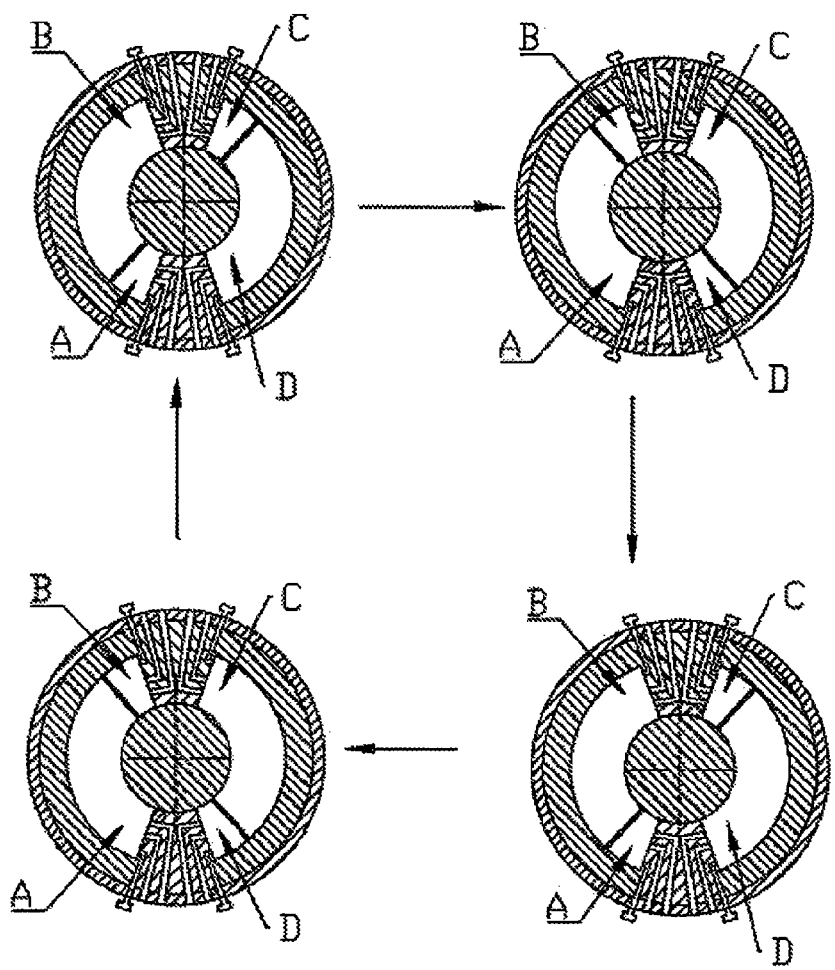
FIG. 4 refers to diagrams of a working cycle process in a cylinder of the embodiment I of the invention.

The working principle of the rotary engine is shown in FIG. 4, wherein the movable baffle 6 and the fixed baffle 7 divide the cylinder body 1 into four cavities A, B, C and D, and the work consists of four working strokes including air suction, compression, ignition and exhaust. A first working cycle is shown at the top left corner in FIG. 4: air is sucked into the cavity A, compressed in the cavity B, ignited and expanded in the cavity C, and exhausted from the cavity D, and the movable baffle 6 is driven to rotate clockwise;

After the first working cycle comes to an end, the rotary engine gets into a second working cycle, therefore air is sucked into the cavity D, compressed in the cavity A, ignited and expanded in the cavity B, and exhausted from the cavity C, and the movable baffle 6 is driven to rotate anticlockwise;

After the second working cycle comes to an end, the rotary engine gets into a third working cycle, therefore air is sucked into the cavity C, compressed in the cavity D, ignited and expanded in the cavity A, and exhausted from the cavity B, and the movable baffle 6 is driven to rotate clockwise;

After the third working cycle comes to an end, the rotary engine gets into a fourth working cycle, therefore air is sucked into the cavity B, compressed in the cavity C, ignited and expanded in the cavity D, and exhausted from the cavity A, and the movable baffle 6 is driven to rotate anticlockwise;

After the fourth working cycle comes to an end, the rotary engine gets into a first working cycle again.

In this way, the four small cycles form a large cycle, the movable baffle 6 is pushed to rotate in a reciprocating manner constantly, and the rotating shaft 63 on the movable baffle 6 drives the rotor 2 to rotate together in one direction constantly via the first one-way bearing 11 and the second one-way bearing 12.

The structure is simple and easy to manufacture, and the compression ratio in the cylinder can be adjusted more easily to achieve the effect of saving fuel oil.

Embodiment II

Figure 5:
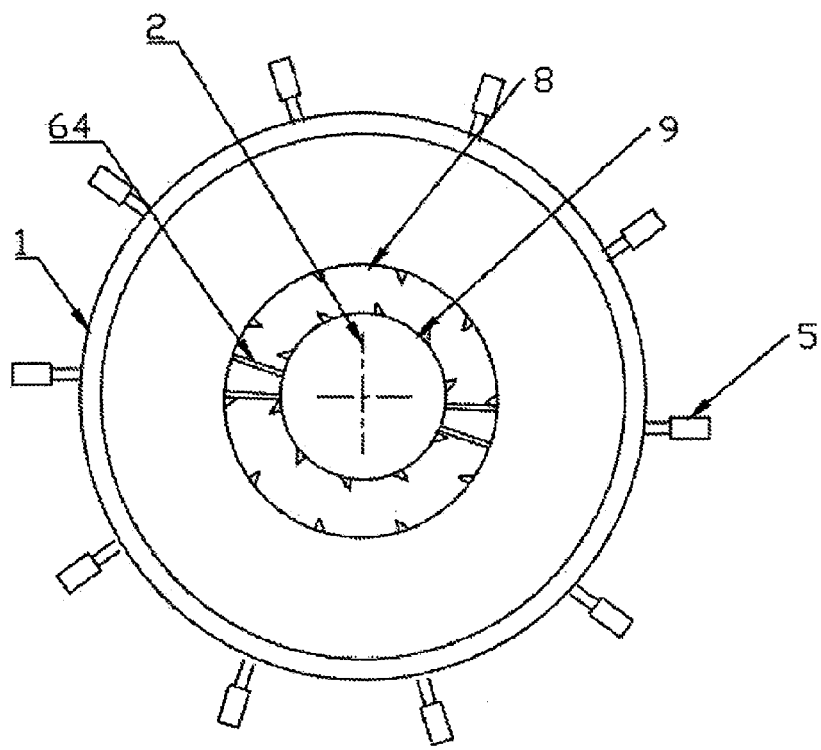
FIG. 5 is a structural diagram I of an embodiment II of the invention.
Figure 6:
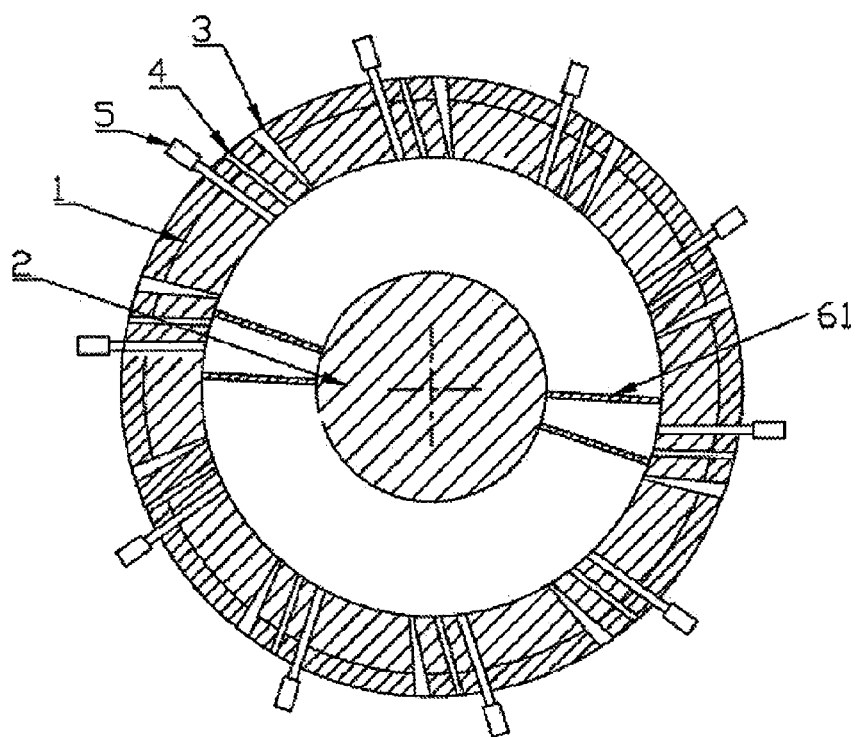
FIG. 6 is a section view of the structural diagram I of the embodiment II of the invention.
Figure 7:
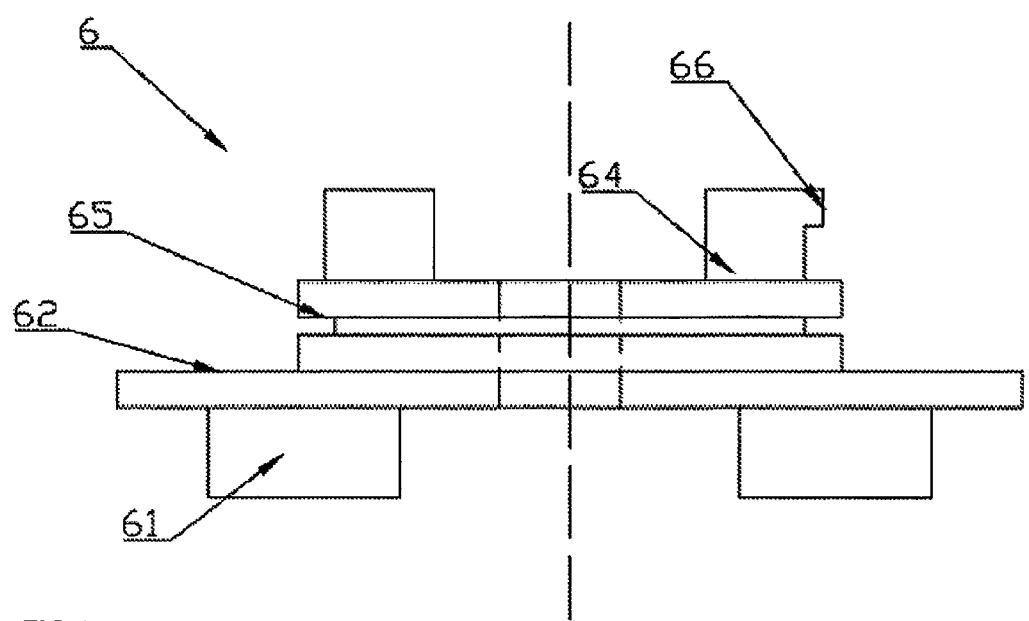
FIG. 7 is a structural diagram of a movable baffle of the embodiment II of the invention.

As shown in FIGS. 5, 6 and 7, a rotary engine comprises a cylinder body 1, a rotor 2, as well as an air inlet 3, an air outlet 4 and an ignition device 5, which are arranged on the cylinder body 1, wherein two sets of movable baffles 6 are arranged between the cylinder body and the rotor 2.

The ignition device can be either a fuel spray nozzle or a sparking plug.

Each set of movable baffle 6 comprises two inner catches 61 and a disk 62 for fixing the inner catches 61, the rotor is arranged in the center of the cylinder body 1, and the disk is arranged on the rotor 2 in a sleeving manner; four sealed cavities are formed by the disks 62, the four inner catches 61 and the inner wall of the cylinder body 1, and correspond to four working strokes including air suction, compression, ignition and exhaust respectively.

The disks 62 can be arranged on the same side of the cylinder body 1, so that the rotary engine is smaller in size, and more compact in structure.

The disks 62 also can be arranged on two sides of the cylinder body 1, so that the disks are more convenient to assemble.

A one-way rotation mechanism is arranged among the two sets of the movable baffles 6, the rotors 2 and the cylinder bodies 1, enables the movable baffles 6 to rotate in one direction around the center of the rotor 2, and drive the rotor 2 to rotate in one direction together.

Figure 9:
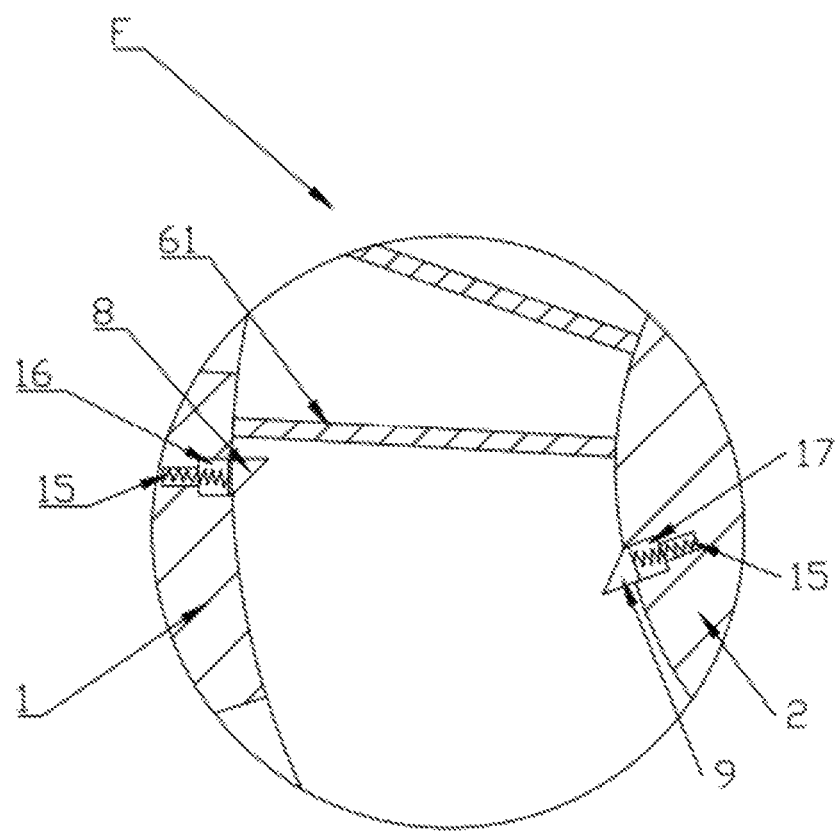
FIG. 9 is an enlarged view of F in FIG. 8.

As shown in FIG. 9, the one-way rotation mechanism comprises first movable teeth 8 and second movable teeth 9, wherein the first movable teeth 8 are radially arranged in first chutes 16 formed in the cylinder body 1, and are in sliding fit with the first chutes 16; a spring 15 is arranged in each first chute, and is propped against one end of the corresponding first movable tooth 8, and the other end of the first movable tooth 8 adopts a slope; the second movable teeth 9 are radially arranged in second chutes 17 formed in the rotor 2, and are in sliding fit with the second chutes 17; a spring 15 is arranged in each second chute 17, and is propped against one end of the corresponding second movable tooth 9, and the other end of the second movable tooth 9 adopts a slope of which the direction is opposite to that of the slopes of the first movable teeth 8. When the inner catches 61 of the movable baffles 6 are propped against slopes of movable teeth, the movable teeth are pressed to be completely embedded into the chutes; after the movable baffles 6 turn to release the slopes, the first movable teeth 8 are repositioned under the action of the restoring force of the corresponding springs; when being propped against the other straight surfaces of the slopes, the inner catches 61 of the movable baffles get stuck with the movable teeth, so that the one-way rotation is realized.

Moreover, the one-way rotation mechanism also can be a set of one-way bearing.

The first movable teeth 8 and the second movable teeth 9 are formed outside the cylinder body 1; outer catches 64 are arranged between the first movable teeth 8 and the second movable teeth 9, and are arranged on the disks 62; the first movable teeth 8 and the second movable teeth 9 are formed outside the cylinder body 1, therefore, the maintenance is more convenient, and the service life is longer.

Figure 8:
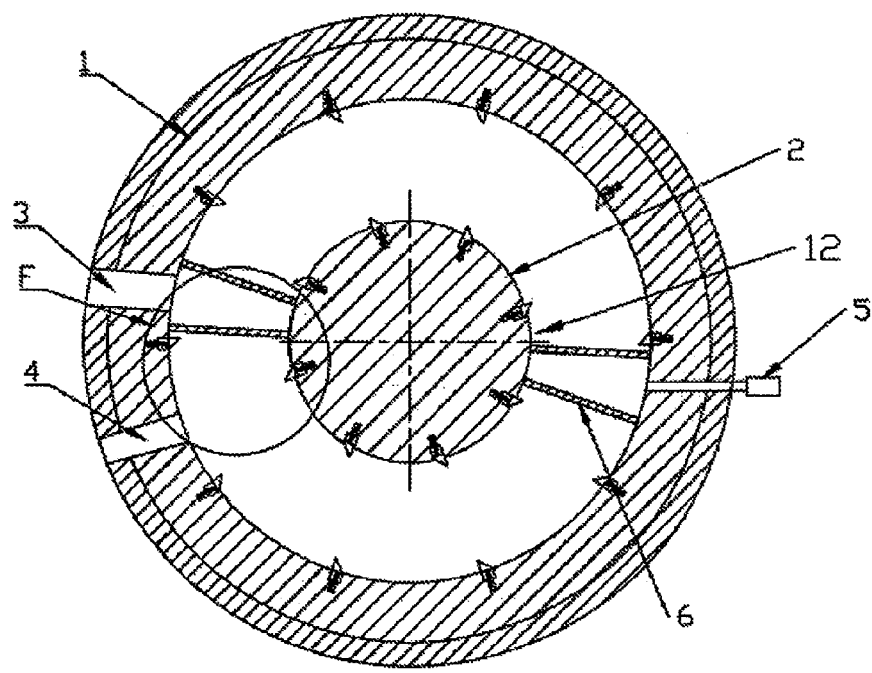
FIG. 8 is a structural diagram II of the embodiment II of the invention.

As shown in FIG. 8, the first movable teeth 8 and the second movable teeth 9 also can be formed in the cylinder body 1, so that the structure is more compact, and the size is smaller.

The air inlet 3, the air outlet 4 and the ignition device 5 are distributed on an outer ring of the cylinder body.

Figure 16:
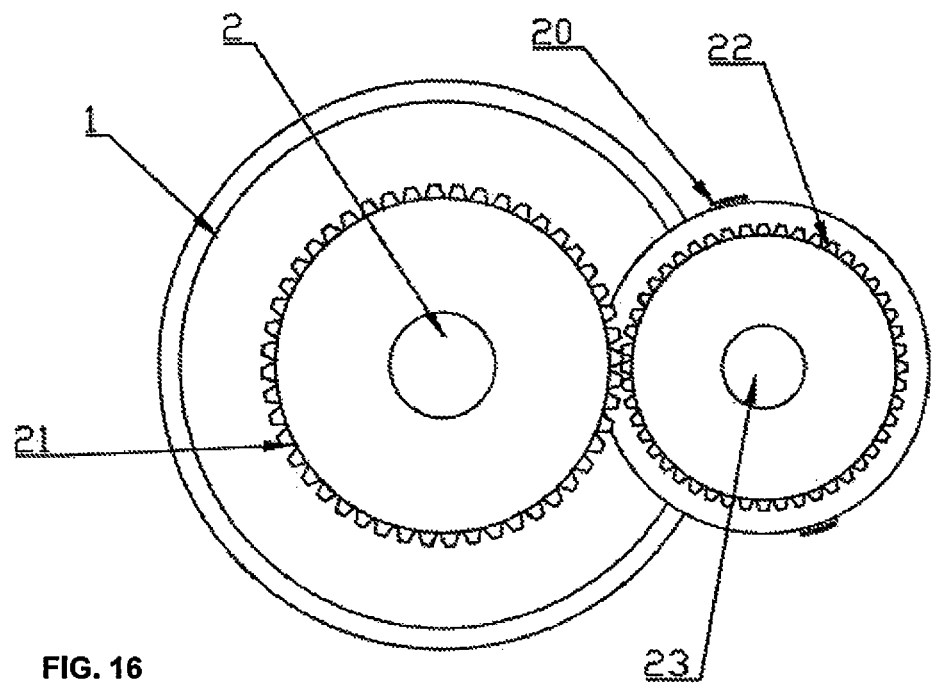
FIG. 16 is a structural diagram I of an intermittent transmission mechanism of an embodiment of the invention.
Figure 17:
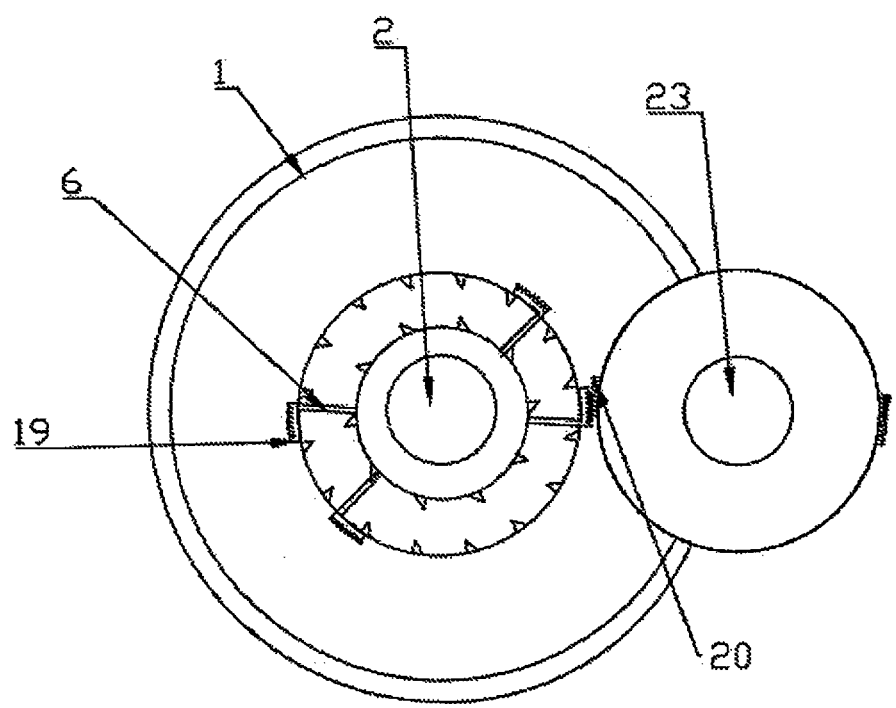
FIG. 17 is a structural diagram II of the intermittent transmission mechanism of the embodiment of the invention.

Moreover, the rotary engine can further comprise an intermittent transmission mechanism used for intermittent transmission between the two sets of the movable baffles. As shown in FIGS. 16 and 17, the intermittent transmission mechanism can be a set of incomplete synchronous gear components, and comprises first incomplete gears 19 arranged on the movable baffles 6, a gearwheel 21 arranged on the rotor 2, a joint shaft 23, and second incomplete gears 20 and a pinion 22 which are arranged on a joint shaft 23; when the rotor 2 rotates, the joint shaft 23 is driven to rotate via meshed transmission of the gearwheel 21 and the pinion 22, and then the joint shaft 23 drives the movable baffles 6 to rotate synchronously in an intermittent manner via the second incomplete gears 20 and the first incomplete gears 19. Therefore, in each working cycle, once one set of the movable baffle 6 rotates for a certain angle, the other set of the movable baffle 6 is driven to rotate synchronously, the two sets of movable baffles are enabled to reach assigned positions to ensure that each ignition is carried out in the same position, one set of the air inlet 3, the air outlet 4 and the ignition device 5 is enough, and the structure is simpler.

The intermittent transmission mechanism also can adopt another form. For example, synchronous projections are formed on the movable baffles 6, so that when one set of the movable baffle 6 rotates for a certain angle, the synchronous projection is propped against the other set of the movable baffle 6 and drives the other set of the movable baffle 6 to rotate.

The rotary engine further comprises a starting device, the starting device comprises a starting motor and a starting coil, and a connecting groove 65 in linked connection with the starting motor and a lug propped against the starting coil are formed in each movable baffle. Once the starting device works, the starting motor can drive one set of the movable baffle 6 to rotate, and the starting coil is propped against the lug 66 on the other set of the movable baffle 6, so as to prevent the other set of the movable baffle 6 from rotating. Moreover, trigger induction devices are further arranged on the movable baffles 6, and can carry out automatic ignition for starting, so that the rotary engine gets into a work state smoothly, and the normal starting work of the rotary engine can be further ensured.

Figure 10:
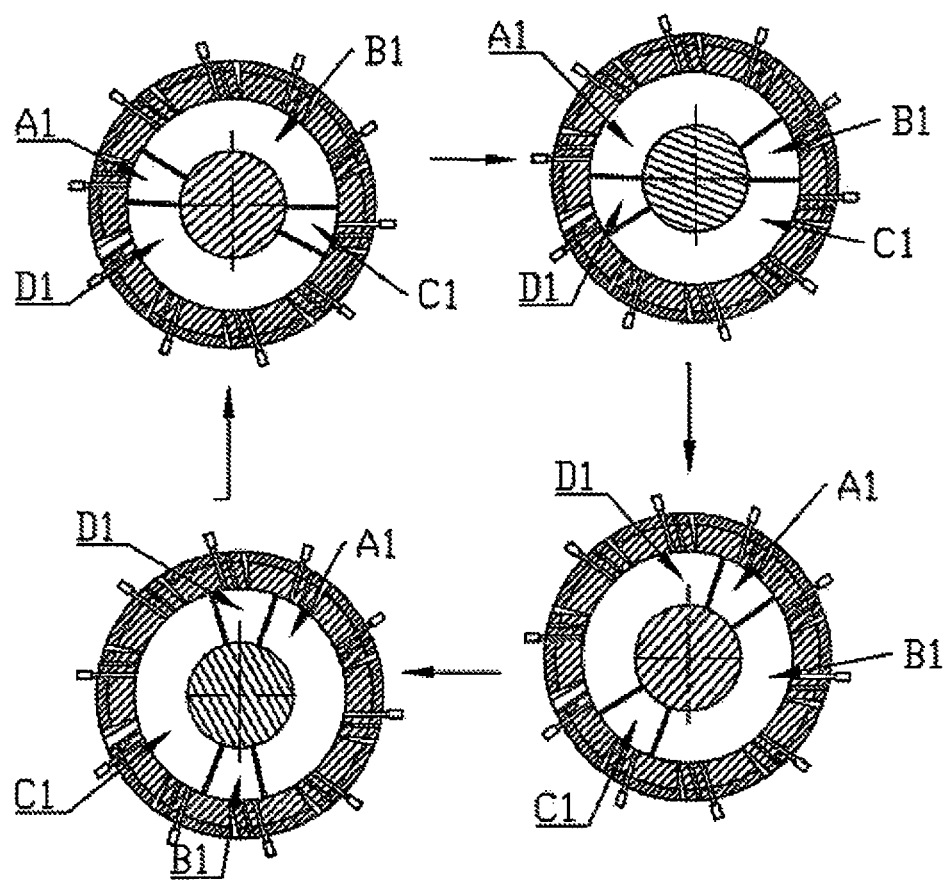
FIG. 10 refers to diagrams of a working cycle in a cylinder of the embodiment II of the invention.

The main working principle of the rotary engine is:

as shown in FIG. 10, when the air inlets 3, the air outlets 4 and the ignition devices 5 are distributed on an outer ring of the cylinder body uniformly in a concentrated manner, the movable baffles 6 divide the cylinder body 1 into four cavities A1, B1, C1 and D1; the work of the rotary engine consists of four working strokes including air suction, compression, ignition and exhaust. A first working cycle is shown at the top left corner in FIG. 10: air is sucked into the cavity A1, compressed in the cavity B1, ignited and expanded in the cavity C1, and exhausted from the cavity D1, the first set of the movable baffle get stuck with the first movable teeth 8, and the second set of the movable baffle gets stuck with the second movable teeth, and drives the rotor 2 to rotate together;

after the first working cycle comes to an end, the rotary engine gets into a second working cycle, therefore air is sucked into the cavity D1, compressed in the cavity A1, ignited and expanded in the cavity B1, and exhausted from the cavity C1, the second set of the movable baffle gets stuck with the first movable teeth 8, and the first set of the movable baffle gets stuck with the second movable teeth, and drives the rotors 2 to rotate together;

after the second working cycle comes to an end, the rotary engine gets into a third working cycle, therefore, air is sucked into the cavity C1, compressed in the cavity D1, ignited and expanded in the cavity A1, and exhausted from the cavity B1, the first set of the movable baffle gets stuck with the first movable teeth 8, and the second set of the movable baffle gets stuck with the second movable teeth, and drives the rotors 2 to rotate together;

after the third working cycle comes to an end, the rotary engine gets into a fourth working cycle, therefore, air is sucked into the cavity B1, compressed in the cavity C1, ignited and expanded in the cavity D1, and exhausted from the cavity A1, the second set of the movable baffle gets stuck with the first movable teeth 8, and the first set of the movable baffle gets stuck with the second movable teeth, and drives the rotors 2 to rotate together;

after the fourth working cycle comes to an end, the rotary engine gets into a first working cycle again.

In this way, the four small cycles form a large cycle, the two sets of the movable baffles 6 take turns to drive the rotor 2 to rotate in a circulatory manner, and the rotor 2 drives an output shaft 9 to rotate in one direction constantly.

The cylinder bodies 1 are divided into a plurality of sealed cavities by utilizing the movable baffles, so that the structure is not only simple but also easy to manufacture, the compression ratio in the cylinder can be adjusted more easily to achieve an effect of saving fuel oil, and the output power is higher.

Embodiment III

Figure 11:
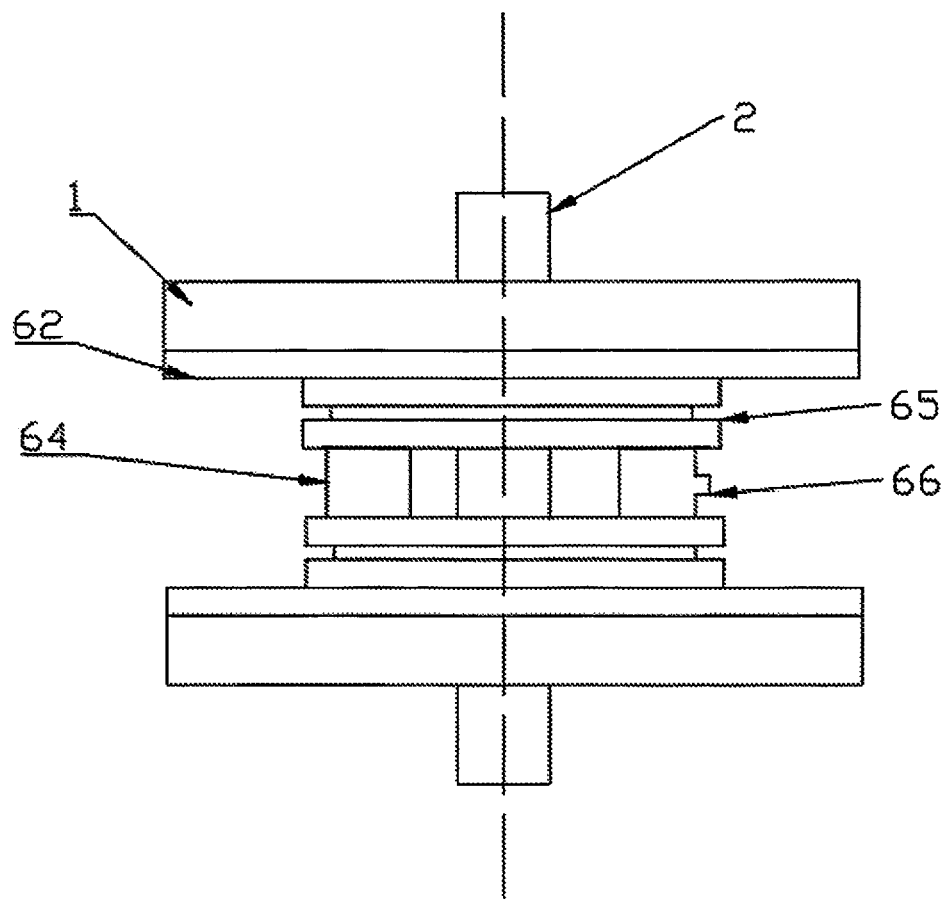
FIG. 11 is a structural diagram I of an embodiment III of the invention.
Figure 12:
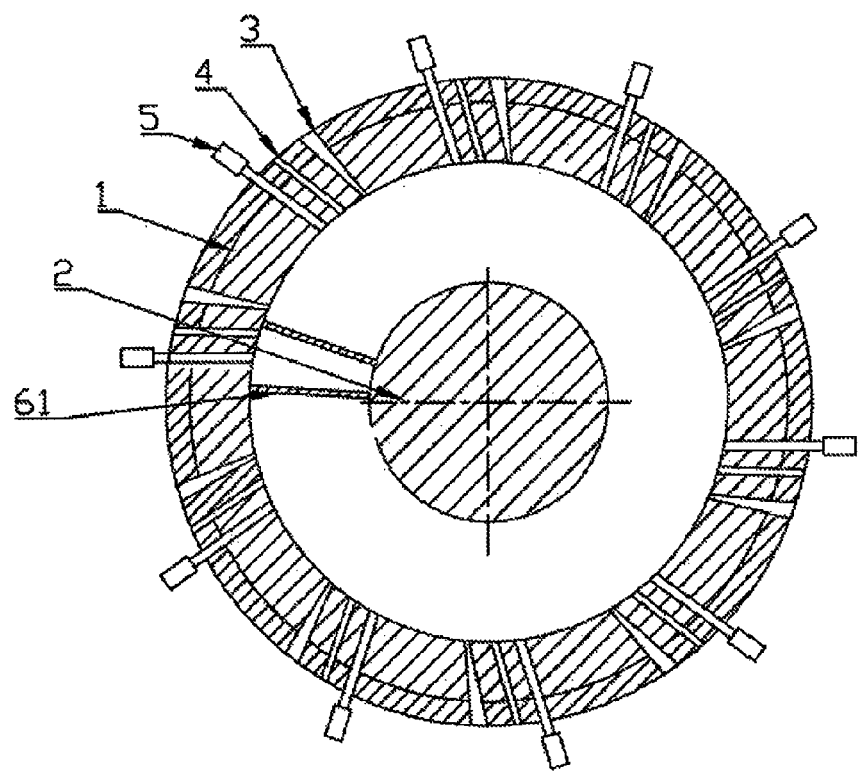
FIG. 12 is a structural diagram II of the embodiment III of the invention.
Figure 13:
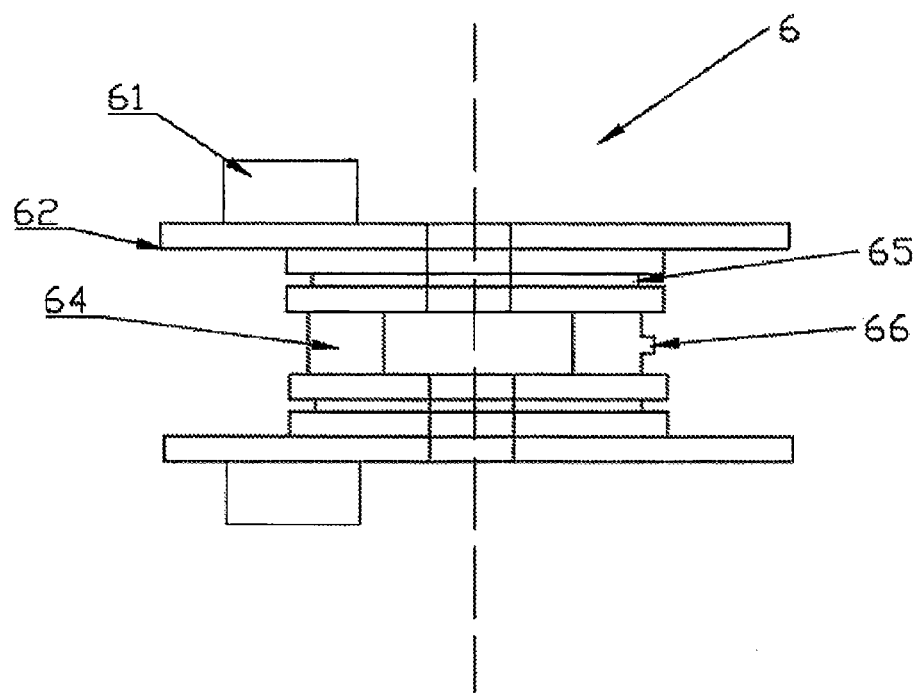
FIG. 13 is a structural diagram of a movable baffle of the embodiment III of the invention.

As shown in FIGS. 11, 12 and 13, the rotary engine comprises cylinder bodies 1, rotors 2, as well as air inlets 3, air outlets 4 and ignition devices 5, which are arranged on the cylinder bodies 1, wherein the number of the cylinder bodies 1 is two; the cylinder bodies 1 include a first cylinder body and a second cylinder body; two sets of movable baffles 6 are arranged in each cylinder body 1, and the movable baffles 6 in the first cylinder body are connected with the movable baffles 6 in the second cylinder body.

Each set of movable baffle 6 comprises one inner catch 61 and a disk 62 for fixing the inner catch 61, the rotors 2 are arranged in the centers of the cylinder bodies 1, and the disks 62 are arranged on the rotors 2 in a sleeving manner.

In each cylinder body 1, two sealed cavities are formed by the disks 62, the inner catches 61, the inner wall of the cylinder body 1, and the outer wall of the rotor 2; the two cylinder bodies comprise four sealed cavities corresponding to four working strokes including air suction, compression, ignition and exhaust respectively.

One-way rotation mechanisms are arranged among the movable baffles 6, the rotors 2 and the cylinder bodies 1, enable the movable baffles 6 to rotate in one direction around the centers of the rotors 2, and drive the rotors 2 to rotate in one direction together.

The rotary engine further comprises a starting device, and the starting device comprises a starting motor and a starting coil;

and a connecting groove 65 in linked connection with the starting motor and a lug propped against the starting coil are formed in the disk 62 of each movable baffle 6. Once the starting device works, the starting motor can drive one set of the movable baffle 6 to rotate, and the starting coil is propped against the lug 66 on the other set of movable baffle 6, so as to prevent the other set of movable baffle 6 from rotating. Moreover, trigger induction devices are further arranged on the movable baffles 6, and can carry out automatic ignition for starting, so that the rotary engine gets into a work state smoothly, and the normal starting work of the rotary engine can be further ensured.

Figure 14:
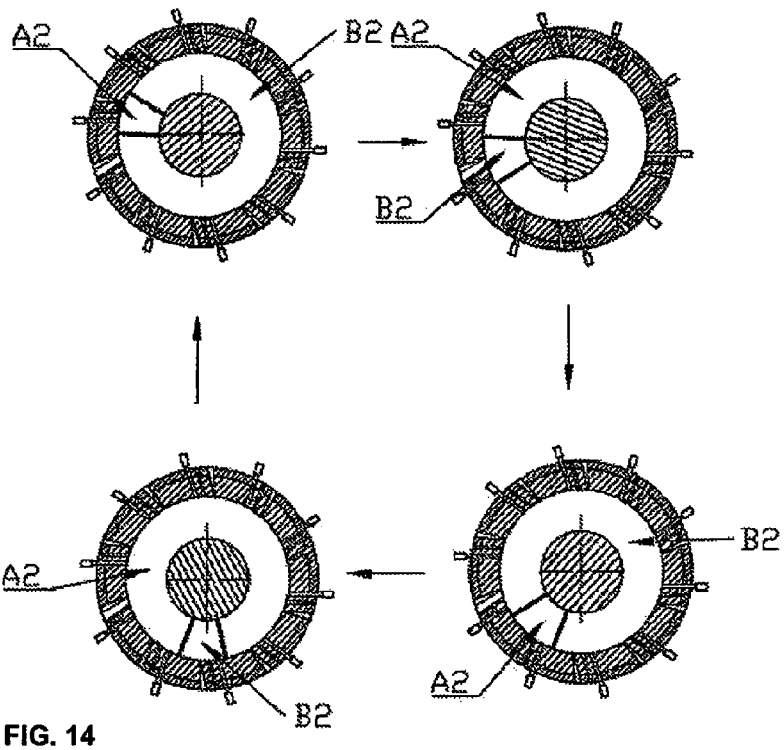
FIG. 14 refers to diagrams of a working cycle in a first cylinder of the embodiment III of the invention.
Figure 15:
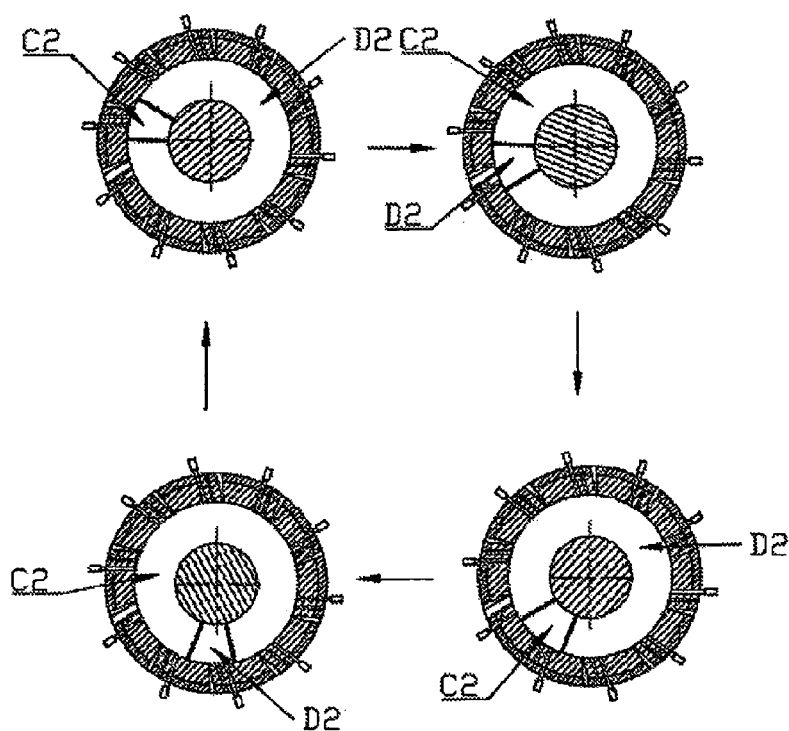
FIG. 15 refers to diagrams of a working cycle in a second cylinder of the embodiment III of the invention.

The main working principle of the rotary engine is shown in FIGS. 14 and 15, FIG. 14 refers to a first cylinder body, and the movable baffles 6 and the rotor 2 divide the first cylinder body into two sealed cavities A2 and B2; FIG. 15 refers to a second cylinder body, and the movable baffles 6 and the rotor 2 divide the second cylinder body into two sealed cavities C2 and D2; as the movable baffles 6 in the first cylinder body and the movable baffles 6 in the second cylinder body are connected, all the movable baffles 6 rotate synchronously.

The work of the rotary engine consists of four working strokes including air suction, compression, ignition and exhaust; a first working cycle is shown at the top left corners in FIGS. 14 and 15: air is sucked into the cavity A2, compressed in the cavity B2, ignited and expanded in the cavity C2, and exhausted from the cavity D2, the cycling work allows first sets of the movable baffles to be fixed, and second sets of the movable baffles to drive the rotors 2 to rotate together;

after the first working cycle comes to an end, the rotary engine gets into a second working cycle, therefore air is sucked into the cavity D2, compressed in the cavity A2, ignited and expanded in the cavity B2, and exhausted from the cavity C2, the cycling work allows the second sets of the movable baffles to be fixed, and the first sets of the movable baffles to drive the rotors 2 to rotate together;

after the second working cycle comes to an end, the rotary engine gets into a third working cycle, therefore air is sucked into the cavity C2, compressed in the cavity D2, ignited and expanded in the cavity A2, and exhausted from the cavity B2, the cycling work allows the first sets of the movable baffles to be fixed, and the second sets of the movable baffles to drive the rotors 2 to rotate together;

after the third working cycle comes to an end, the rotary engine gets into a fourth working cycle, therefore air is sucked into the cavity B2, compressed in the cavity C2, ignited and expanded in the cavity D2, and exhausted from the cavity A2, the cycling work allows the second sets of the movable baffles to be fixed, and the first sets of the movable baffles to drive the rotors 2 to rotate together;

after the fourth working cycle comes to an end, the rotary engine gets into a first working cycle again.

The four small cycles form a large cycle, wherein the two sets of the movable baffles 6 take turns to drive the rotors 2 to rotate in a cycling manner, and the rotors 2 drive output shafts 9 to rotate together in one direction constantly.

The cylinder bodies 1 are divided into a plurality of sealed cavities by utilizing the movable baffles, and the two cylinder bodies are superposed for the cycling work, so that the structure is not only simple but also easy to manufacture, the compression ratios in the cylinders can be adjusted more easily to achieve an effect of saving fuel oil, and the output power is higher.

Embodiment IV

Figure 18:
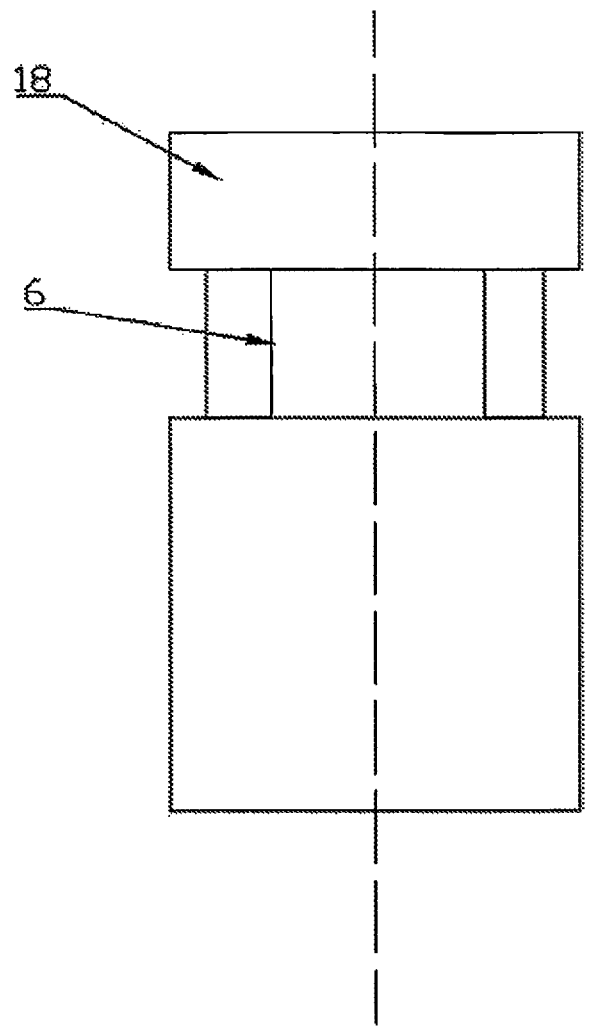
FIG. 18 is a structural diagram of an embodiment IV of the invention.

Moreover, as shown in FIG. 18, a compressor comprises a compression component 18 and a rotary engine, and the compression component comprises a compression cylinder and a compression partition board.

As shown in FIGS. 1-17, the rotary engine comprises a cylinder body 1, a rotor 2, as well as an air inlet 3, an air outlet 4 and an ignition device 5, which are arranged on the cylinder body 1, wherein at least one set of movable baffle 6 is arranged in the cylinder body 1, and is in seal fit with the inner wall of the cylinder body 1 to form at least two sealed cavities; the movable baffle 6 can rotate around the center of the cylinder body 1; the movable baffle 6 is connected with the compression partition board, and can drive the compression partition board to rotate, therefore, functions of a compressor are achieved, and the structure is simple and easy to manufacture.

Moreover, the compressor also can be used as water pumps, vacuum pumps, fans and other similar structures.

The invention shall not be limited to the disclosed embodiments, and any improvement based on the spirit of the invention shall fall into the protection scope of the invention.

The invention claimed is:

1. A rotary engine, comprising:
   a cylinder body;
   a rotor;
   an air inlet;
   an air outlet;
   an ignition device, the ignition device, air inlet, and air outlet arranged on the cylinder body;
   a set of movable baffles arranged in the cylinder body and in seal fit with an inner wall of the cylinder body to form at least two sealed cavities in the cylinder body, the set of movable baffles configured to rotate around a center of the cylinder body in a reciprocating manner, the set of movable baffles comprising two inner catches and a disk for fixing the inner catches, and a rotating shaft further arranged at a center of the disk;
   a fixed baffle fixed in position relative to the cylinder body; and
   a one-way rotation mechanism forming a mechanical connection between the movable baffle and the rotor such that movement of the set of movable baffles causes movement of the one-way rotation mechanism, the one-way rotation mechanism thereby driving the rotor to rotate in one direction;
   wherein the one-way rotation mechanism comprises a first one-way bearing and a second one-way bearing which are arranged on the rotating shaft but different in direction, the first one-way bearing and the second one-way bearing are connected with the rotor via two sets of different transmission mechanisms respectively, one transmission mechanism set drives the rotor and the first one-way bearing to rotate in the same direction, while the other transmission mechanism set drives the rotor and the second one-way bearing to rotate in opposite directions.

2. The rotary engine of claim 1, wherein the transmission mechanism set driving the rotor and the first one-way bearing to rotate in the same direction is a belt transmission mechanism, and the transmission mechanism set driving the rotor and the second one-way bearing to rotate in the opposite directions is a gear meshing transmission mechanism.

3. The rotary engine of claim 1, wherein the fixed baffle and the cylinder body form an integral structure, and the air inlet, the air outlet and the ignition device are arranged in the fixed baffle.

4. The rotary engine of claim 1, wherein two sets of movable baffles are arranged in the cylinder body, and rotate in one and the same direction around the center of the cylinder body.

5. The rotary engine of claim 4, wherein each set of movable baffle comprises two inner catches and a disk for fixing the inner catches, the rotor is arranged in the center of the cylinder body, and the disk is arranged on the rotor in a sleeving manner.

6. The rotary engine of claim 5, wherein the disks are arranged on same side of the cylinder body.

7. The rotary engine of claim 6, wherein the one-way rotation mechanisms comprise first movable teeth and second movable teeth; first chutes used for mounting of the first movable teeth are radially formed in the cylinder bodies; the first movable teeth are in sliding fit with the first chutes; an elastic resetting element is connected with one end of each first movable tooth, while the other end of the first movable tooth is a slope; second chutes used for mounting of the second movable teeth are radially formed in the rotors; the second movable teeth are in sliding fit with the second chutes; an elastic resetting element is connected with one end of each second movable tooth, while the other end of the second movable tooth is a slope of which the direction is opposite to that of the slopes of the first movable teeth.

8. The rotary engine of claim 7, wherein the first movable teeth and the second movable teeth are arranged outside the cylinder bodies, and outer catches are arranged between the first movable teeth and the second movable teeth, and are connected with the disks.

9. The rotary engine of claim 4, wherein each set of movable baffle comprises one inner catch and a disk for fixing the inner catch, the rotor is arranged in the center of the cylinder body, and the disk is arranged on the rotor in a sleeving manner.

10. The rotary engine of claim 9, wherein the number of the cylinder bodies is two, the two cylinder bodies are superposed, and the movable baffles in one cylinder body are fixedly connected with the movable baffles in the other cylinder body.

11. The rotary engine of claim 4, wherein a plurality of sets of air inlets, air outlets and ignition devices are distributed on outer rings of the cylinder bodies uniformly in a concentrated manner.

12. The rotary engine of claim 4, further comprising an intermittent transmission mechanism used for intermittent transmission between the two sets of the movable baffles.

13. The rotary engine of claim 1, wherein a plurality of sets of cylinder bodies and movable baffles in the cylinder bodies are superposed.

14. A rotary engine, comprising:
a cylinder body;
a rotor;
an air inlet;
an air outlet;
an ignition device, the ignition device, air inlet, and air outlet arranged on the cylinder body;
a set of movable baffles arranged in the cylinder body, and in seal fit with an inner wall of the cylinder body to form at least two sealed cavities in the cylinder body, the set of movable baffles configured to rotate around a center of the cylinder body in a reciprocating manner;
a fixed baffle fixed in position relative to the cylinder body; and
a one-way rotation mechanism forming a mechanical connection between the set of movable baffles and the rotor such that movement of the set of movable baffles causes movement of the one-way rotation mechanism, the one-way rotation mechanism thereby driving the rotor to rotate in one direction;
wherein the fixed baffle and the cylinder body form an integral structure, and the air inlet, the air outlet and the ignition device are arranged in the fixed baffle.

15. The rotary engine of claim 14, wherein the set of movable baffle comprises two inner catches and a disk for fixing the inner catches, and a rotating shaft is further arranged in a center of the disk.

16. The rotary engine of claim 15, wherein the one-way rotation mechanism comprises a first one-way bearing and a second one-way bearing which are arranged on the rotating shaft but different in direction, the first one-way bearing and the second one-way bearing are connected with the rotor via two sets of different transmission mechanisms respectively, one transmission mechanism set drives the rotor and the first one-way bearing to rotate in the same direction, while the other transmission mechanism set drives the rotor and the second one-way bearing to rotate in opposite directions.

17. The rotary engine of claim 16, wherein the transmission mechanism set driving the rotor and the first one-way bearing to rotate in the same direction is a belt transmission mechanism, and the transmission mechanism set driving the rotor and the second one-way bearing to rotate in the opposite directions is a gear meshing transmission mechanism.

18. The rotary engine of claim 14, wherein two sets of movable baffles are arranged in the cylinder body, and rotate in one and the same direction around the center of the cylinder body.

19. The rotary engine of claim 18, wherein each set of movable baffle comprises two inner catches and a disk for fixing the inner catches, the rotor is arranged in the center of the cylinder body, and the disk is arranged on the rotor in a sleeving manner.

20. The rotary engine of claim 19, wherein the disks are arranged on same side of the cylinder body.

* * * * *